United States Patent
Ogasahara

(10) Patent No.: US 8,286,630 B2
(45) Date of Patent: Oct. 16, 2012

(54) APPARATUS FOR RECYCLING MOISTURE EXHALED FROM WORKER WITHIN DRY ROOM TO THE WORKER

(75) Inventor: Minoru Ogasahara, Kyoto (JP)

(73) Assignee: Itswa Co., Ltd., Kyoto (JP)

( * ) Notice: Subject to any disclaimer, the term of this patent is extended or adjusted under 35 U.S.C. 154(b) by 592 days.

(21) Appl. No.: 12/527,591

(22) PCT Filed: Feb. 21, 2007

(86) PCT No.: PCT/JP2007/053177
§ 371 (c)(1),
(2), (4) Date: Sep. 17, 2009

(87) PCT Pub. No.: WO2008/114334
PCT Pub. Date: Sep. 25, 2008

(65) Prior Publication Data
US 2010/0078027 A1    Apr. 1, 2010

(51) Int. Cl.
*A62B 18/08* (2006.01)
*A62B 7/10* (2006.01)
*A62B 23/02* (2006.01)
*A61M 16/00* (2006.01)
*A61M 16/10* (2006.01)
*B01D 53/06* (2006.01)

(52) U.S. Cl. ......... 128/201.13; 128/200.24; 128/203.11; 128/203.16; 128/205.27; 128/205.29; 96/125

(58) Field of Classification Search ............. 128/201.25, 128/203.16, 204.13, 203.26
See application file for complete search history.

(56) References Cited

U.S. PATENT DOCUMENTS

| | | | |
|---|---|---|---|
| 4,048,993 A | | 9/1977 | Dobritz |
| 4,055,173 A | * | 10/1977 | Knab ............................ 128/847 |
| 4,168,706 A | * | 9/1979 | Fletcher et al. .......... 128/204.16 |
| 4,901,716 A | * | 2/1990 | Stackhouse et al. ..... 128/201.25 |
| 5,042,474 A | * | 8/1991 | Williamson ............. 128/206.12 |

(Continued)

FOREIGN PATENT DOCUMENTS

DE      1169615 B    5/1964

(Continued)

*Primary Examiner* — Jacqueline Cheng
*Assistant Examiner* — Christopher Miller
(74) *Attorney, Agent, or Firm* — Kirschstein, et al.

(57) ABSTRACT

The apparatus is equipped with cover unit (1) fixed to a head portion of worker so as to cover at least the regions of nose and mouth of the worker, the cover unit capable of trapping the worker's breath. The cover unit has an exhaust opening and an air supply opening. Further, the apparatus is equipped with moisture recycle unit (2) fitted to the worker so as to simultaneously carry out the two processes consisting of the adsorption process of introducing moist air, effecting adsorption of the water contained in the air on an adsorbent and emitting dry air and the regeneration process of introducing dry air, effecting evaporation of the water adsorbed on the adsorbent into the dry air and emitting moist air. Still further, the apparatus is equipped with exhaust hose (3) connecting the exhaust opening of the cover unit to the moisture recycle unit and with air supply hose (4) connecting the moisture recycle unit to the air supply opening of the cover unit. The exhaust from the cover unit (1) is emitted via the moisture recycle unit into the dry room as dry air, and the dry air within the dry room is fed via the moisture recycle unit into the cover unit as moist air.

6 Claims, 6 Drawing Sheets

U.S. PATENT DOCUMENTS

| | | | |
|---|---|---|---|
| 5,046,492 A * | 9/1991 | Stackhouse et al. | 128/200.27 |
| 5,054,480 A * | 10/1991 | Bare et al. | 128/201.25 |
| 5,242,473 A * | 9/1993 | Ogasahara | 96/125 |
| 5,482,031 A * | 1/1996 | Lambert | 128/203.12 |
| 5,533,500 A * | 7/1996 | Her-Mou | 128/201.25 |
| 5,689,968 A * | 11/1997 | Frustaci et al. | 62/259.3 |
| 6,099,623 A * | 8/2000 | Namatame et al. | 96/125 |
| 6,330,883 B1 * | 12/2001 | Berger | 128/201.13 |
| 6,767,391 B2 * | 7/2004 | Tanaka et al. | 96/115 |
| 7,007,690 B1 * | 3/2006 | Grove et al. | 128/201.25 |
| 2001/0052343 A1 * | 12/2001 | Reedy et al. | 128/204.15 |
| 2007/0028769 A1 | 2/2007 | Eplee et al. | |

FOREIGN PATENT DOCUMENTS

| | | |
|---|---|---|
| EP | 0372859 | 6/1990 |
| JP | 02-257966 | 10/1990 |
| JP | 2257966 | 10/1990 |
| JP | 08-229129 | 9/1996 |
| JP | 09-136275 | 5/1997 |
| JP | 11-287478 | 10/1999 |
| JP | 2000-005311 | 1/2000 |
| JP | 2001-081622 | 3/2001 |
| JP | 2001-159009 | 6/2001 |
| JP | 2002-204921 | 7/2002 |
| JP | 2003-112008 | 4/2003 |
| JP | 2006-272329 | 10/2006 |

* cited by examiner

APPARATUS FOR RECYCLING MOISTURE EXHALED FROM WORKER WITHIN DRY ROOM TO THE WORKER

TECHNICAL FIELD

The present invention relates to a device for collecting moisture exhaled from a worker who works in a dry room and returning the collected moisture back to the worker so as to block discharge of moisture from the worker into the dry room.

BACKGROUND ART

In the manufacturing process of semiconductor device, lithium battery, and the like, a dry room is used since atmosphere consisting of dry air with low dew point of lower than or equal to −50° C. is required. The dry room is equipped with a dehumidifier, where air exhausted from the dry room is fed to the dehumidifier and dehumidification process is performed by the dehumidifier, and the resulting dry air with low dew point is supplied from the dehumidifier to the dry room, so that atmosphere consisting of dry air with low dew point is uniformly maintained throughout the entire dry room.

In this case, in order to maintain uniform and constant atmosphere consisting of dry air with low dew point in the dry room, air with dew point of lower than the required level must be supplied to the dry room. Consequently, as the dry room grows larger, the airflow circulating between the dry room and the dehumidifier must be increased so as to supply a large amount of dry air with low dew point. To this end, a large and high-performance dehumidifier is required, which leads to a problem of increase of the installation cost and the running cost.

Almost all of moisture generated in the dry room is the moisture contained in air exhaled from the worker who works in the dry room, and, in the prior art, the moist air is dehumidified by the dehumidifier and again supplied to the dry room.

Thus, in the prior art, there is provided a method of directly exhausting moisture exhaled from the worker who works in the dry room to the outside of the dry room. According to one example of such conventional methods, a worker who works in the dry room wears a cover clothes, and air inside the cover clothes is sucked and exhausted to the outside of the room by an exhaust means. In this method, the air inside the cover clothes is exhausted from below the cover clothes, fed from an air intake provided on the floor of the dry room into an exhaust chamber, and exhausted to the outside of the dry room.

In this method, however, the worker always needs to stand at the air intake of the floor when the air inside the cover clothes is exhausted, so that the worker cannot freely move in the dry room. Furthermore, the air needs to be sucked from the air intake at a considerable wind speed in order to reliably take in the air exhausted from the inside of the cover clothes, whereby the running cost of an air blower therefor becomes high.

In addition, according to this method, the worker continues to be deprived of moisture of the body and becomes dehydrated in a short period of time, so that the worker cannot work in the dry room over a long period of time in consideration of health care of the worker.

Patent document 1: Japanese Laid-Open Patent Publication No. 11-287478

DISCLOSURE OF THE INVENTION

Problems to be Solved by the Invention

It is an object of the present invention to provide a device for preventing discharge of the moisture from the worker into the dry room without interfering with long periods of work in the dry room.

Means for Solving the Problems

In order to solve the above problem, the present invention provides a device for collecting moisture contained in exhaled air of a worker who works in a dry room and returning the collected moisture to the worker together with inspired air, the device comprising: a cover unit fixed to a head or a neck of the worker for covering at least a region of nose and mouth of the worker so as to collect the exhaled air of the worker, the cover unit having an exhaust opening and an air supply opening; a moisture recycle unit worn by the worker for simultaneously performing two processes of an adsorption process and a regeneration process, the adsorption process consisting of taking in moist air, adsorbing the moisture contained in the moist air on an adsorbent, and emitting the resulting dry air, the regeneration process consisting of taking in dry air, evaporating the moisture adsorbed by the adsorbent into the dry air, and emitting the resulting moist air; an exhaust hose for connecting the exhaust opening of the cover unit and the moisture recycle unit; and an air supply hose for connecting the air supply opening of the cover unit and the moisture recycle unit, whereby moist air exhausted into the cover unit is dehydrated through the moisture recycle unit and the resulting dry air is emitted into the dry room, while dry air took in from the dry room is charged with moisture through the moisture recycle unit and the resulting moist air is supplied into the cover unit.

In the above configuration, preferably, the cover unit comprises a helmet having an opening for receiving the head of the worker, put on and fixed to the head of the worker, the helmet comprising at least a transparent region for assuring the worker's viewing, an attachment member provided at an outer periphery or an inner periphery of the opening for connecting to a collar part of a working clothes of the worker in an air tight manner, and a ventilation opening provided at an area of the helmet deviated from the face of the worker for defogging.

More preferably, one exhaust opening is formed on both sides at a lower part of the helmet and one air supply opening is formed at the back part of the helmet, one end opening of each of two exhaust hoses extending from the associated exhaust opening to a vicinity of the mouth of the worker in the helmet.

Preferably, the cover unit comprises a mask, the mask having: a cap for covering the region of nose and mouth of the worker; and an attachment band attached to the cap for fixing the cap to a fixed position on the face of the worker.

Furthermore, preferably, the moisture recycle unit comprises a dehumidifier unit, the dehumidifier unit comprising: a casing whose interior is divided into two zones of an adsorption zone and a regeneration zone; a rotation shaft arranged along an interface between the adsorption zone and the regeneration zone inside the casing, and rotated around its axis by a motor; an adsorption rotor having honeycomb or corrugated structure, the adsorption rotor being coupled to the rotation shaft in such a manner that one portion of the adsorption rotor is located in the adsorption zone and the remaining portion of the adsorption rotor is located in the regeneration zone at all times so as to repeatedly pass through the adsorption zone and the regeneration zone with the rotation of the rotation shaft; a first air intake provided at the casing for taking moist air of the cover unit into the adsorption zone; a first air exit provided at the casing for emitting dry air from the adsorption zone; a second air intake provided at the casing for taking dry air of the dry room into the regeneration zone; a second air exit provided at the casing for emitting moist air from the regeneration zone, and the moisture recycle unit further comprises: a first fan unit provided with an air suction opening and an air blow opening and fixed to the dehumidifier rotor, the air suction opening being connected to the exhaust hose, the air blow opening being connected to the first air intake of the dehumidifier unit; a second fan unit provided with an air suction opening and an air blow opening and fixed to the dehumidifier unit, the air suction opening being connected to the second air exit of the dehumidifier unit, the air blow opening being connected to the air supply hose; an attachment member fixed to the dehumidifier unit for wearing the dehumidifier unit on the worker; and a battery unit worn by the worker so as to supply power to the first and second fan units, and the motor of the dehumidifier unit.

Alternatively, the moisture recycle unit comprises: a casing provided with an air intake and an air exit, as well as first and second venting holes; a first chamber arranged in the casing for accommodating a first adsorbent, the first adsorbent having honeycomb or corrugated structure; a second chamber arranged in the casing for accommodating a second adsorbent, the second adsorbent having honeycomb or corrugated structure; a 2-position 4-port type switching valve arranged in the casing; a first pipe line arranged in the casing for connecting the air intake and a first port of the switching valve; a second pipe line arranged in the casing for connecting a second port of the switching valve and the first chamber; a third pipe line arranged in the casing for connecting the air discharge port and a third port of the switching valve; a fourth pipe line arranged in the casing for connecting a fourth port of the switching valve and the second chamber; a fifth pipe line arranged in the casing for connecting the first chamber and the first venting hole; a sixth pipe line arranged in the casing for connecting the second chamber and the second venting hole; a first fan unit provided with an air suction opening and an air blow opening and fixed to the casing, the air suction opening being connected to the exhaust hose, the air blow opening being connected to the air intake of the casing; a second fan unit provided with an air suction opening and an air blow opening and fixed to the casing, the air suction opening being connected to the air exit of the casing, the air blow opening being connected to the air supply hose; an attachment member fixed to the casing for wearing the casing on the worker; and a battery unit worn by the worker so as to supply power to the first and second fan units, whereby when the switching valve is located at a first position, the first pipe line and the second pipe line are connected to each other, and at the same time, the third pipe line and the fourth pipe line are connected to each other, and when the switching valve is located at a second position, the first pipe line and the fourth pipe line are connected to each other, and at the same time, the third pipe line and the second pipe line are connected to each other.

Effect of the Invention

According to the present invention, the entire device can be worn by the worker, so that air exhaled from the worker who works in the dry room is collected and the moisture contained in the exhaled air is adsorbed on the adsorbent and the resulting dry air is emitted into the dry room. Furthermore, the adsorbent is regenerated using dry air taken in from the dry room, and the moisture evaporated from the adsorbent is returned to the aspirated air of the worker, whereby discharge of the moisture from the worker into the dry room is blocked, an atmosphere of low dew point dry air enough for work in the dry room can be maintained by employing a small dehumidifier, and so, the installation and running cost can be reduced. In addition, the worker is protected against dehydration during work over long period of time, and problems of health care of the worker will not arise.

EXPLANATION OF REFERENCE NUMERALS

Figure 1:
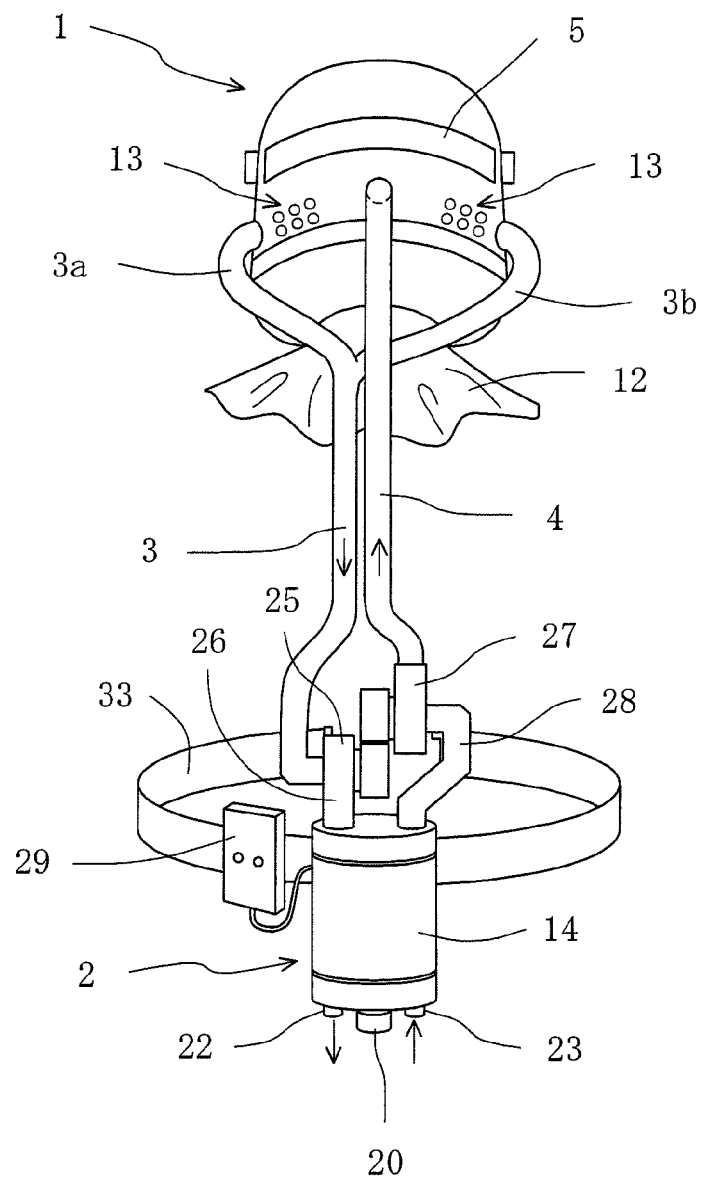
FIG. 1 is a perspective view schematically showing a configuration of a device for re-circulating moisture exhaled from a worker who works in a dry room back to the worker according to a first example of the present invention.

1 helmet
2 moisture recycle unit
3 exhaust hose
4 air supply hose
5 opening
6 exhaust opening
7 air supply opening
8 head gear
9 front opening
10 shield
11 rotation member
12 attachment member
13 ventilation opening
14 dehumidifier unit
15 casing
16a, 16b partition plate
17 adsorption rotor
18 rotation shaft
19 sleeve
20 motor
21 first air intake
22 first air exit
23 second air intake
24 second air exit
25 first fan unit
27 second fan unit
31 adsorption zone
32 regeneration zone

BEST MODE FOR CARRYING OUT THE INVENTION

Figure 2:
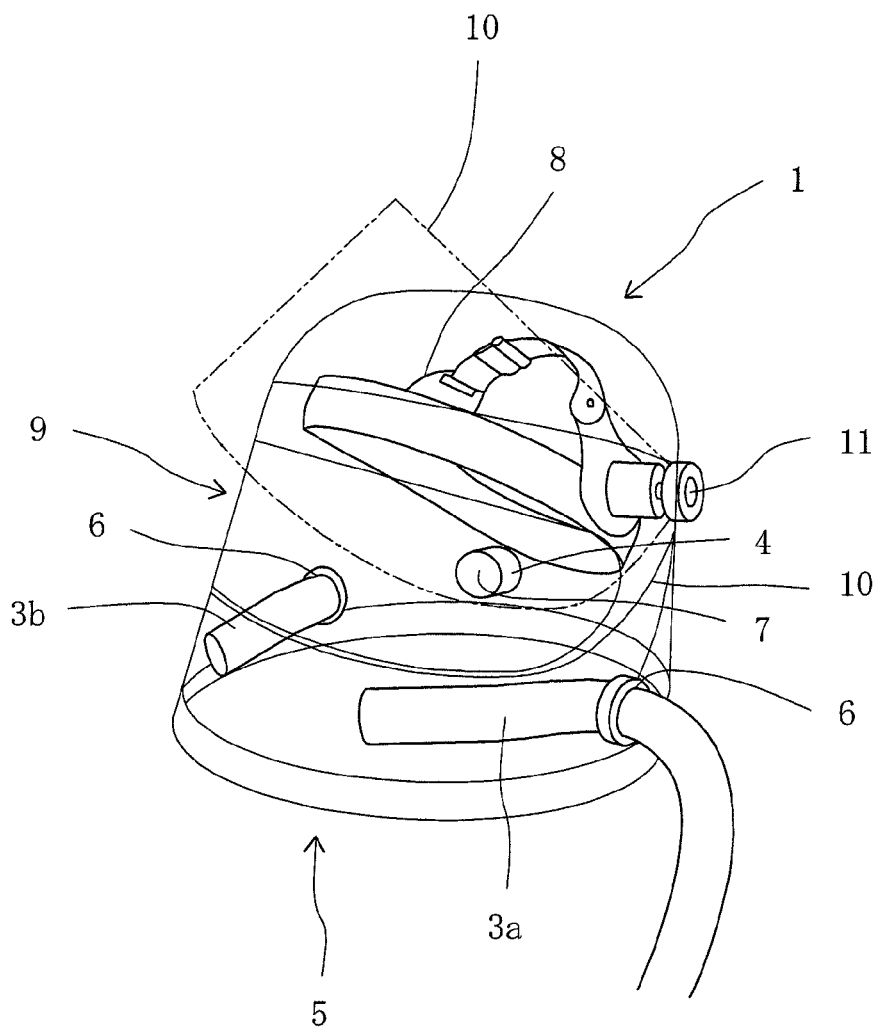
FIG. 2 is a perspective view schematically showing a configuration of a cover unit.

Preferred embodiments of the present invention will now be explained with reference to the accompanying drawings. FIG. 1 is a perspective view of a device for re-circulating moisture exhaled from a worker who works in a dry room back to the worker according to a first embodiment of the present invention, and FIG. 2 is a perspective view schematically showing a configuration of a cover unit of the device shown in FIG. 1. The device of the present invention comprises a cover unit fixed to a head or a neck of a worker for covering at least a region of nose and mouth of the worker so as to collect air exhaled from the worker. In this embodiment, the cover unit has a helmet 1 provided with an opening 5 for receiving the head of the worker as well as an exhaust opening 6 and an air supply opening 7. The helmet 1 is put on and fixed to the head of the worker, as shown in FIG. 1 and FIG. 2. In this embodiment, one exhaust opening 6 is formed on both sides at the lower part of the helmet 1, and one air supply opening 7 is formed at the back part of the helmet 1.

The helmet 1 is made of transparent plastic. In this case, the entire helmet 1 does not need to be transparent, and at least a transparent region for assuring the worker's viewing during work merely needs to be formed in the helmet 1.

Although not shown, a ring shaped head gear 8 for fixing the helmet 1 to the head is attached to the upper part on the inner side of the helmet 1. Furthermore, a front opening 9 is formed at a horizontally long portion facing an area extending between both ears through both eyes of the worker, and a transparent shield 10 for covering the front opening 9 is attached. The shield 10 is attached to the helmet 1 by rotation members 11 for rotation around the rotation members 11 so as to enable the front opening 9 to be opened and closed by hand.

An attachment member 12 is provided at the inner periphery of the opening 5 of the helmet 1 for connecting to the collar part of the working clothes of the worker in an air tight manner. A ventilation opening 13 is provided at an area of the helmet 1 deviated from the face of the worker in the helmet 1, for example, the back head part of the helmet 1 for defogging the inner wall face of the helmet 1.

The device of the present invention also comprises a moisture recycle unit 2 worn by the worker for simultaneously performing two processes of an adsorption process and a regeneration process. The adsorption process consists of taking in moist air, absorbing the moisture contained in the air on an adsorbent and emitting the resulting dry air; and the regeneration process consists of taking in dry air, evaporating the moisture adsorbed by the adsorbent into the dry air, and emitting the resulting moist air.

Figure 3:
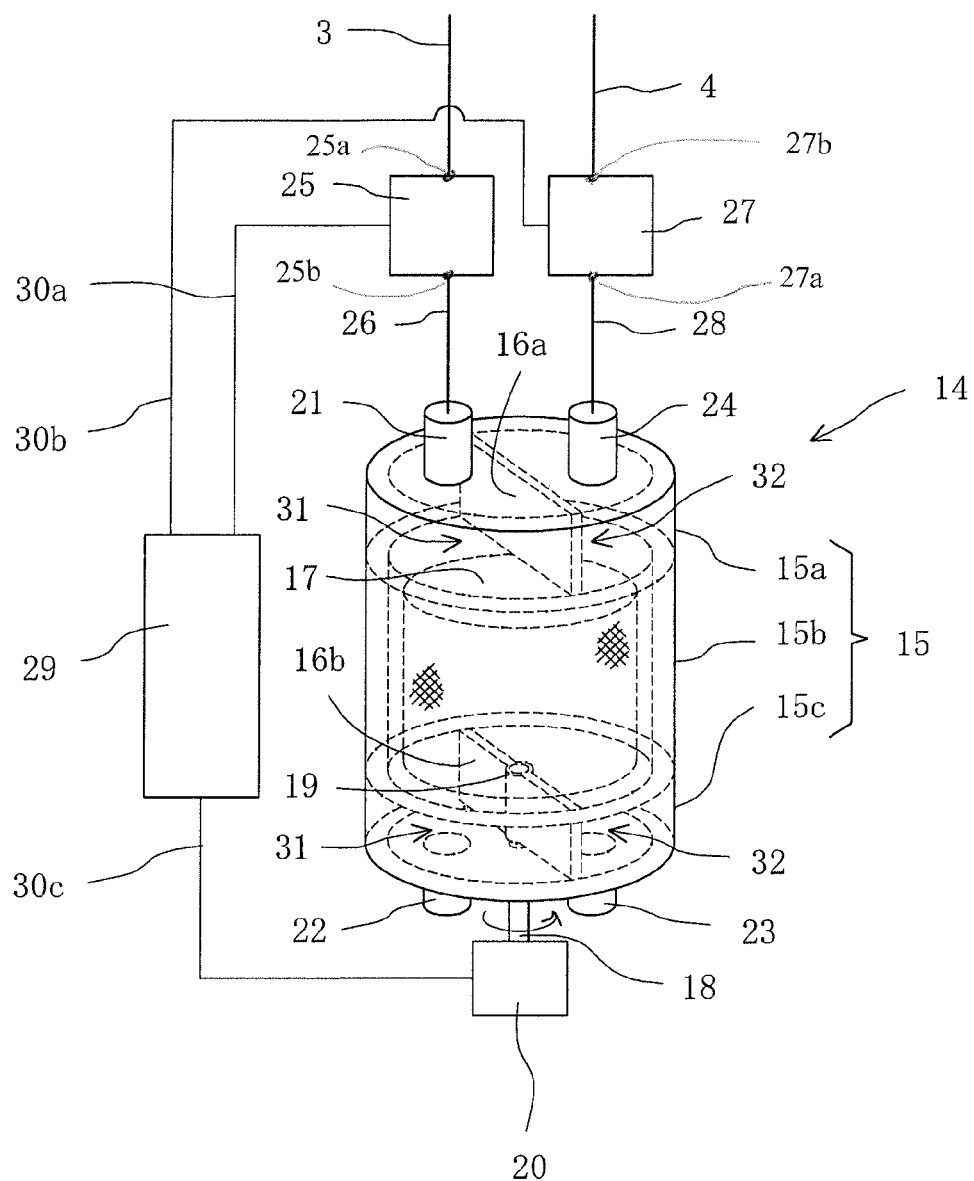
FIG. 3 is a schematic view showing a pipe line system of a moisture recycle unit.

FIG. 3 is a schematic view showing a pipe line system of the moisture recycle unit. Referring to FIG. 3, the moisture recycle unit 2 includes a dehumidifier unit 14. The dehumidifier unit 14 comprises a cylindrical casing 15 whose end openings are closed. The casing 15 is composed of three portions 15a, 15b, and 15c and capable of being disassembled so that an adsorption rotor 17 can be detached. The first portion 15a and the third portion 15c is a cylinder whose one end opening is closed, and the second portion 15b is a cylinder. The casing 15 is assembled by joining the openings (not shown) of the first portion 15a and the third portion 15c to both end openings of the second portion 15b through a seal member. Rib shaped partition plates 16a, 16b, which extend in the diameter direction and in the axial direction, are arranged on the inner side of the first and the second portions 15a, 15b, and the cylindrical adsorption rotor 17 with honeycomb or corrugated structure is accommodated in the second portion 15b. The adsorption rotor 17 is formed by molding material including known adsorbent material such as zeolite, silica gel, activated carbon, activated alumina, etc. into the form of honeycomb or corrugate. The adsorption rotor has narrow air flow paths extending along the rotation axis thereof, and the air flow paths are isolated from each other so as to block incomings and outgoings of air.

A rotation shaft 18 is coupled to the adsorption rotor 17 and extends along the center axis of the rotor 17. The rotation shaft 18 passes through a sleeve 19 arranged at the center of the third portion 15c of the casing, and is connected to a drive shaft of a motor 20 fixed to the outer side of the casing 15.

The interior of the casing 15 is divided into two zones, that is, an adsorption zone 31 and a regeneration zone 32, by the partition plates 16a, 16b, and one portion of the adsorption rotor 17 is located in the adsorption zone 31 and the remaining portion of the adsorption rotor 17 is located in the regeneration zone 32 at all times so that the adsorption rotor 17 repeatedly passes through the adsorption zone 31 and the regeneration zone 32 with the rotation of the rotation shaft 18.

At the closed end face of the first portion 15a of the casing, a first air intake 21 is provided for communicating to the adsorption zone 31 of the casing 15 so as to take in moist air from the helmet 1, and a second air exit 24 is provided for communicating to the regeneration zone 32 of the casing 15 so as to emit dry air from the regeneration zone 32. At the closed end face of the third portion 15c of the casing, a first air exit 22 is provided for communicating to the adsorption zone 31 of the casing 15 so as to emit dry air from the adsorption zone 31, and a second air intake 23 is provided for communicating to the regeneration zone of the casing so as to take in dry air from the dry room. The seal member isolates the adsorbed and reproduced air from each other in the casing 15. That is, the air flowed into the adsorption zone and the regeneration zone is directed to the predetermined adsorption zone and regeneration zone of the adsorption rotor 17, and so, mixture of the air of both zones is avoided.

The moisture recycle unit 2 further comprises first and second fan units 25, 27 each of which is provided with an air suction opening and an air blow opening, and is fixed by the dehumidifier unit 14. One end of an exhaust hose 3 is connected to the air suction opening of the first fan unit 25, and the other end of the exhaust hose 3 is connected to the exhaust opening 6 of the helmet 1. In this embodiment, the other end of the exhaust hose 3 is branched into two since two exhaust openings 6 are provided at the helmet 1. The ends 3a, 3b branched from the exhaust hose 3 are respectively extended from the associated exhaust opening 6 to the inside of the helmet 1 so that the respective openings lead up to the vicinity of the mouth of the worker. The air exhaled from the worker is therefore efficiently and reliably collected. The air blow opening of the first fan unit 25 is connected to the first air intake 21 of the dehumidifier unit 14 through a ventilation pipe 26.

The air suction opening of the second fan unit 27 is connected to the second air exit 24 of the dehumidifier 14 through a second ventilation pipe 28, and one end of an air supply hose 4 is connected to the exhaust opening. The other end of the air supply hose 4 is connected to the air supply opening 7 of the helmet 1.

The dehumidifier unit 14 may be fixed to the worker with an appropriate attachment member. In this embodiment, the attachment member is a waist belt 33 attached to the dehumidifier unit 14, and the dehumidifier unit 14 is worn at the hip of the worker. A harness may be used in place of the waist belt, and, in this case, the dehumidifier unit 14 is carried at the back of the worker. The first and second fan units 25, 27 have air suction openings 25a, 27a and air blow openings 25b, 27b.

The device of the present invention further comprises a battery unit 29 worn by the worker so as to supply power to the first and second fan units 25, 27 and to the motor 20 of the dehumidifier unit 14. The battery unit 29 is connected to the first and second fan units 25, 27 and the motor 20 through cables 30a, 30b and 30c.

According to such configuration, the worker wears the helmet 1 on the head and the moisture recycle unit 2 and the battery unit 29 on the hip, enters the dry room and carries out the predetermined work. The air exhaled from the worker is taken into the adsorption zone 31 of the dehumidifier unit 14 from the exhaust opening 6 of the helmet 1 through the exhaust hose 3 and the first air intake 21 of the moisture recycle unit 2. The moisture contained in the exhaled air is then adsorbed by the adsorption rotor 17, and the resulting dry air is emitted into the dry room from the first air exit 22. Simultaneously, the dry air of the dry room is taken into the regeneration zone 32 of the dehumidifier unit 14 from the second air intake 23 of the moisture recycle unit 2. The moisture of the adsorption rotor 17 then evaporates into the dry air, and the resulting moist air is supplied into the helmet 1 from the air supply opening 7 of the helmet 1 through the second air exit 24 and the air supply hose 4.

Meanwhile, the adsorption rotor 17 of the dehumidifier unit 14 repeatedly is moved between the regeneration zone 32 and the adsorption zone 31 of the casing 15, and evaporates the moisture adsorbed in the adsorption zone 31 into the regeneration zone 32. Therefore, the adsorption rotor 17 is not saturated with the moisture.

Figure 4:
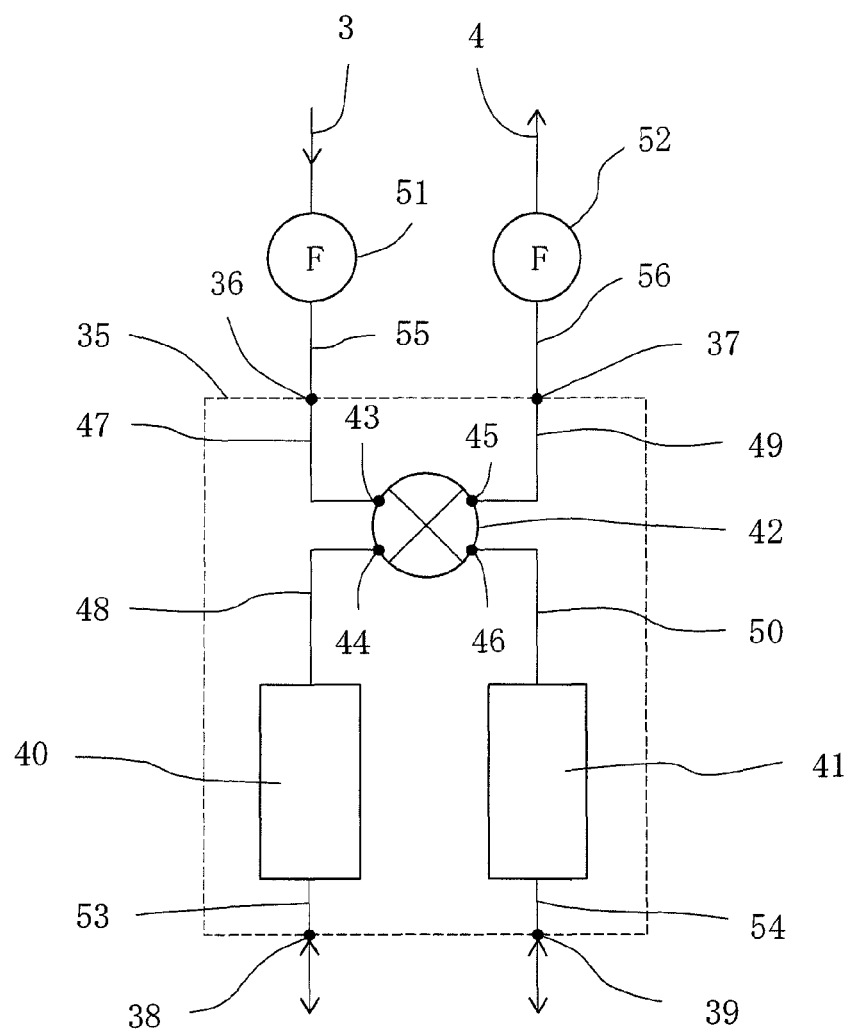
FIG. 4 is a schematic view showing another embodiment of a pipe line system of a moisture recycle unit.

The configuration of the present invention is not limited to the above embodiment. FIG. 4 is a schematic view showing a pipe line system of another embodiment of the moisture recycle unit. In this embodiment, a moisture recycle unit 2' has a casing 35 provided with an air intake 36 and an air exit 37 as well as first and second venting holes 38, 39, as shown in FIG. 4. The casing 35 includes a first chamber 40 for accommodating a first adsorbent with honeycomb or corrugated structure, a second chamber 41 is arranged for accommodating a second adsorbent with honeycomb or corrugated structure, and a 2-position 4-port type switching valve 42.

The air intake 36 and a first port 43 of the switching valve 42 are connected by a first pipe line 47, a second port 44 of the switching valve 42 and the first chamber 40 are connected by a second pipe line 48, the air exit 37 and a third port 45 of the switching valve 42 are connected by a third pipe line 49, and a fourth port 46 of the switching valve 42 and the second chamber 41 are connected by a fourth pipe line 50. Furthermore, the first chamber 40 and the first venting hole 38 are connected by a fifth pipe line 53, and the second chamber 41 and the second venting hole 39 are connected by a sixth pipe line 54.

The moisture recycle unit 2' is further comprises first and second fan units 51, 52 each of which is provided with an air suction opening and an air blow opening, and fixed by the casing 35. One end of the exhaust hose 3 is connected to the air suction opening of the first fan unit 51, and the air blow opening is connected to the air intake 36 of the casing 35 through a ventilation pipe 55. The air suction opening of the second fan unit 52 is connected to the air exit 37 of the casing 35 through a second ventilation pipe 56, and one end of the air supply hose 4 is connected to the exhaust opening.

Figure 5:
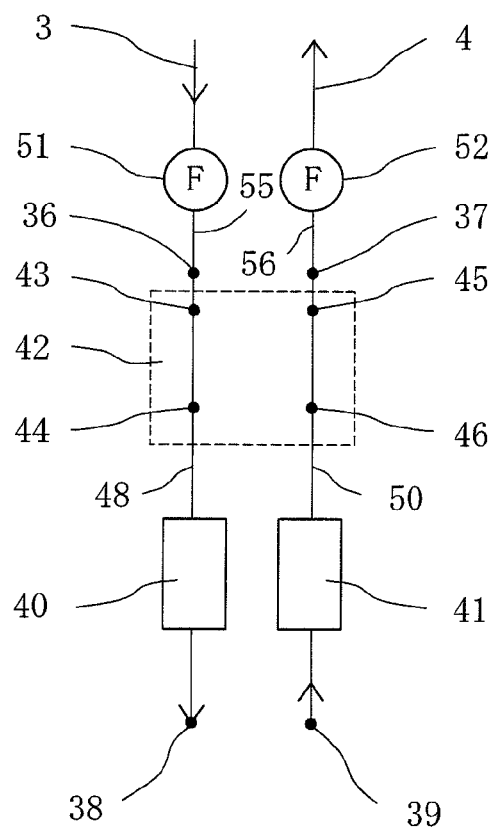
FIG. 5 is a view explaining operation of switching valve of the moisture recycle unit of FIG. 4.
Figure 5:
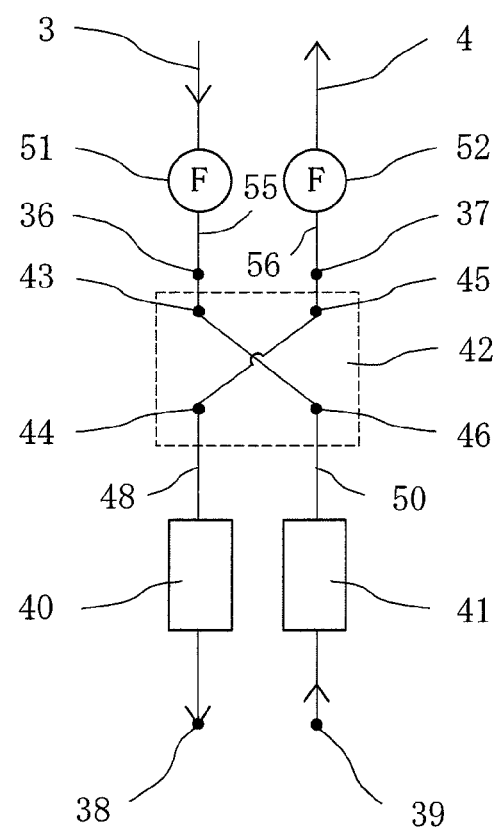

FIG. 5 is a view describing the switching operation of the switching valve. FIG. 5(A) shows a state in which the switching valve is located at a first position, and FIG. 5(B) shows a state in which the switching valve is located at a second position. As shown in FIG. 5(A), when the switching valve 42 is located at the first position, the first pipe line 47 and the second pipe line 48 are connected to each other, and at the same time, the third pipe line 49 and the fourth pipe line 50 are connected to each other. Thus the moist air exhausted from the exhaust opening 6 of the helmet 1 is taken into the first chamber 40 from the air intake 36, and the dry air generated by the adsorption process of the first adsorbent is emitted from the first venting hole 38 into the dry room. Simultaneously, the dry air of the dry room is taken into the second chamber 41 from the second venting hole 39, and the moist air generated by the regeneration process of the second adsorbent is fed from the air exit 37 to the air supply opening 7 of the helmet 1. As shown in FIG. 5(B), when the switching valve 42 is located at the second position, on the other hand, the first pipe line 47 and the fourth pipe line 50 are connected to each other, and at the same time, the third pipe line 49 and the second pipe line 48 are connected to each other. Thus the moist air exhausted from the exhaust opening 6 of the helmet 1 is taken from the air intake 36 into the second chamber 41, and the dry air generated by the adsorption process of the second adsorbent is exhausted into the dry room from the second venting hole 39. Simultaneously, the dry air of the dry room is taken from the first venting hole 38 into the first chamber 40, and the moist air generated by the regeneration process of the first adsorbent is fed to the air supply opening 7 of the helmet 1 from the air exit 37.

According to the above embodiment, the adsorption process and the regeneration process of the moisture recycle unit 2' are simultaneously advanced while alternately switching between the first and the second chambers 40, 41. The switching operation of the switching valve 42 is appropriately performed at a constant time interval so that the adsorbent in each chamber 40, 41 is not saturated with the moisture.

Figure 6:
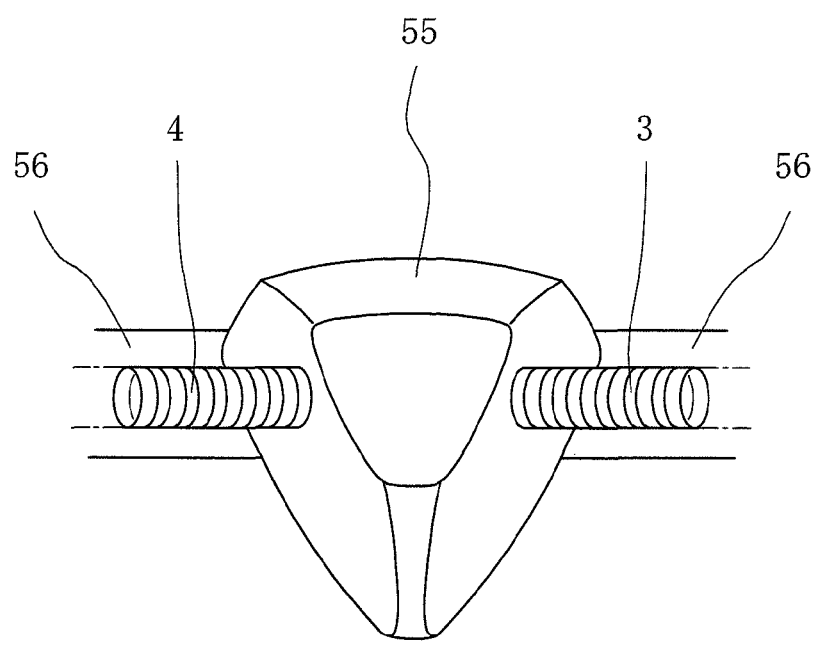
FIG. 6 is a plan view of another embodiment of the cover unit.

Furthermore, the cover unit is a helmet in the above embodiment, but the cover unit may be a mask having a cap 55 for covering the region of nose and mouth of the worker, and an attachment band 56 to be attached to the cap 55 for fixing the cap 55 to a fixed position on the face of the worker, as shown in FIG. 6.

The invention claimed is:

1. A device for collecting moisture contained in exhaled air of a worker who works in a dry room and returning the collected moisture to the worker together with inspired air, the device comprising:
   a cover unit adapted to be fixed to a head or a neck of the worker for covering at least a region of nose and mouth of the worker so as to collect the exhaled air of the worker, the cover unit having an exhaust opening and an air supply opening;
   a moisture recycle unit with an adsorption unit, the moisture recycle unit adapted to be worn by the worker for simultaneously performing two processes of an adsorption process and a regeneration process, the adsorption process consisting of taking in moist air, adsorbing the moisture contained in the moist air on the adsorption unit, and emitting the resulting dry air, the regeneration process consisting of taking in dry air, evaporating the moisture adsorbed by the adsorption unit into the dry air, and emitting the resulting moist air;
   an exhaust hose for connecting the exhaust opening of the cover unit and the moisture recycle unit; and
   an air supply hose for connecting the air supply opening of the cover unit and the moisture recycle unit,
   whereby moist air exhausted into the cover unit is dehydrated through the moisture recycle unit and the resulting dry air is emitted into the dry room, while dry air taken in from the dry room is humidified through the moisture recycle unit and the resulting moist air is supplied into the cover unit.

2. The device according to claim 1, wherein the cover unit is a helmet having a helmet opening for receiving the head of the worker adapted to be, put on and fixed to the head of the worker, the helmet comprising at least a transparent region for assuring the worker's viewing, an attachment member provided at an outer periphery or an inner periphery of the helmet opening for connecting to a collar part of a working clothes of the worker to seal the helmet opening, and a ventilation opening provided at an area of the helmet offset from the face of the worker for defogging.

3. The device according to claim 2, wherein the exhaust hose comprises a first exhaust hose ending and a second exhaust hose ending; and
   the exhaust opening comprises a first exhaust opening and a second exhaust opening, each of the two exhaust openings located on opposing sides of a lower part of the helmet; and
   the air supply opening is formed at a back part of the helmet; and
   the first exhaust hose ending extends from the first exhaust opening to a vicinity of the mouth of the worker in the helmet; and
   the second exhaust hose ending extends from the second exhaust opening to a vicinity of the mouth of the worker in the helmet.

4. The device according to claim 1, wherein the cover unit is a mask,
   the mask having:
   a cap for covering the region of nose and mouth of the worker; and
   an attachment band attached to the cap for fixing the cap to a fixed position on a face of the worker.

5. The device according to claim 1, wherein the moisture recycle unit comprises a dehumidifier unit,
   the dehumidifier unit comprising:
   a casing whose interior is divided into two zones of an adsorption zone and a regeneration zone;
   a rotation shaft arranged along an interface between the adsorption zone and the regeneration zone inside the casing, and the rotation shaft is rotated by a motor;
   wherein the adsorption unit is an adsorption rotor having a honeycomb or corrugated structure, the adsorption rotor being coupled to the rotation shaft in such a manner that one portion of the adsorption rotor is located in the adsorption zone and the remaining portion of the adsorption rotor is located in the regeneration zone and the rotation of the rotation shaft causes the adsorption rotor to pass through the adsorption zone and the regeneration zone;
   a first air intake provided at the casing for taking moist air of the cover unit into the adsorption zone;
   a first air exit provided at the casing for emitting dry air from the adsorption zone;
   a second air intake provided at the casing for taking dry air of the dry room into the regeneration zone;
   a second air exit provided at the casing for emitting moist air from the regeneration zone, and
   the moisture recycle unit further comprises:
   a first fan unit provided with an air suction opening and an air blow opening and the first fan unit is fixed to the dehumidifier unit, the air suction opening being connected to the exhaust hose, the air blow opening being connected to the first air intake of the dehumidifier unit;
   a second fan unit provided with an air suction opening a second and air blow opening and the second fan unit is fixed to the dehumidifier unit, the second air suction opening being connected to the second air exit of the dehumidifier unit, the second air blow opening being connected to the air supply hose;
   an attachment member fixed to the dehumidifier unit for wearing the dehumidifier unit on the worker; and
   a battery unit adapted to be worn by the worker so as to supply power to the first and second fan units, and the motor of the dehumidifier unit.

6. The device according to claim 1, wherein the adsorption unit comprises a first adsorption unit and a second adsorption unit, and the moisture recycle unit comprises:
   a casing provided with an air intake and an air exit, as well as first and second venting holes;
   a first chamber arranged in the casing for accommodating the first adsorption unit, the first adsorption unit having a honeycomb or corrugated structure;
   a second chamber arranged in the casing for accommodating the second adsorption unit, the second adsorption unit having a honeycomb or corrugated structure;
   a 2-position 4-port type switching valve arranged in the casing;
   a first pipe line arranged in the casing for connecting the air intake and a first port of the switching valve;
   a second pipe line arranged in the casing for connecting a second port of the switching valve and the first chamber;
   a third pipe line arranged in the casing for connecting the air exit and a third port of the switching valve;
   a fourth pipe line arranged in the casing for connecting a fourth port of the switching valve and the second chamber;
   a fifth pipe line arranged in the casing for connecting the first chamber and the first venting hole;
   a sixth pipe line arranged in the casing for connecting the second chamber and the second venting hole;
   a first fan unit provided with an air suction opening and an air blow opening and the first fan unit is fixed to the casing, the air suction opening being connected to the exhaust hose, the air blow opening being connected to the air intake of the casing;
   a second fan unit provided with a second air suction opening and a second air blow opening and the second fan unit is fixed to the casing, the second air suction opening being connected to the air exit of the casing, the second air blow opening being connected to the air supply hose;
   an attachment member fixed to the casing for wearing the casing on the worker; and
   a battery unit adapted to be worn by the worker so as to supply power to the first and second fan units,
   whereby when the switching valve is located at a first position, the first pipe line and the second pipe line are connected to each other, and at the same time, the third pipe line and the fourth pipe line are connected to each other, and when the switching valve is located at a second position, the first pipe line and the fourth pipe line are connected to each other, and at the same time, the third pipe line and the second pipe line are connected to each other.

* * * * *